United States Patent
Schmaus et al.

(10) Patent No.: US 8,795,562 B2
(45) Date of Patent: Aug. 5, 2014

(54) METHOD AND DEVICE FOR GRANULATING POLYMER MELTS CONTAINING BLOWING AGENT

(75) Inventors: Paulus Schmaus, Ludwigshafen (DE); Michael Heeger, Ludwigshafen (DE); Joachim Ruch, Wachenheim (DE); Jan Holoch, Leimen (DE); Christian Rasch, Römerberg (DE)

(73) Assignee: BASF SE, Ludwigshafen (DE)

( * ) Notice: Subject to any disclaimer, the term of this patent is extended or adjusted under 35 U.S.C. 154(b) by 176 days.

(21) Appl. No.: 12/293,334

(22) PCT Filed: Mar. 15, 2007

(86) PCT No.: PCT/EP2007/052441
§ 371 (c)(1),
(2), (4) Date: Sep. 17, 2008

(87) PCT Pub. No.: WO2007/107493
PCT Pub. Date: Sep. 27, 2007

(65) Prior Publication Data

US 2009/0108480 A1 Apr. 30, 2009

(30) Foreign Application Priority Data

Mar. 22, 2006 (EP) .................................... 06111521

(51) Int. Cl.
*B29B 9/06* (2006.01)
*B29B 9/16* (2006.01)
*B28B 11/16* (2006.01)

(52) U.S. Cl.
CPC .. *B29B 9/065* (2013.01); *B29B 9/16* (2013.01)
USPC ............................ 264/142; 264/141; 264/143

(58) Field of Classification Search
CPC ...................................................... B29B 9/065
USPC ............. 264/13, 14, 140, 141, 142, 143, 145, 264/148
See application file for complete search history.

(56) References Cited

U.S. PATENT DOCUMENTS 3,092,489 A 6/1963 Smith
(Continued)

FOREIGN PATENT DOCUMENTS

DE 1915950 A1 12/1969
(Continued)

OTHER PUBLICATIONS

Mack, M., et al., "Trends in Underwater Pelletizer Technology: Considering New Types of Polyolefin Resins," Polyolefins XI Retec, Feb. 1999, Houston, Texas, pp. 215-220.
(Continued)

*Primary Examiner* — Atul P. Khare
(74) *Attorney, Agent, or Firm* — Drinker Biddle & Reath LLP

(57) ABSTRACT

The invention relates to a process and an apparatus for pelletizing polymer melts comprising blowing agent in a pelletizing chamber through which a liquid flows, its pressure being above the ambient pressure. In a first step, the polymer melt is injected into the pelletizing chamber, in a second step the polymer melt is cut via a cutting apparatus into individual pellets and, in a third step, the pellets produced in the pelletizing process are discharged with the liquid from the pelletizing chamber and are then isolated from the liquid. This process also comprises at least one of the following steps:
(a) comminution of agglomerates or of pellets which exceed a prescribed maximum size, in a comminuting machine downstream of the pelletizing chamber or in a comminuting unit downstream of the cutting apparatus,
(b) depressurization of the liquid in a depressurizing machine,
(c) depressurization of the liquid in a throttle apparatus, where there is, upstream of the throttle apparatus, a pressure-equalizing container,
(d) isolation of the pellets from the liquid, without any prior depressurization of the liquid with the pellets which it comprises.

13 Claims, 7 Drawing Sheets

(56) References Cited

U.S. PATENT DOCUMENTS

Figure 1:
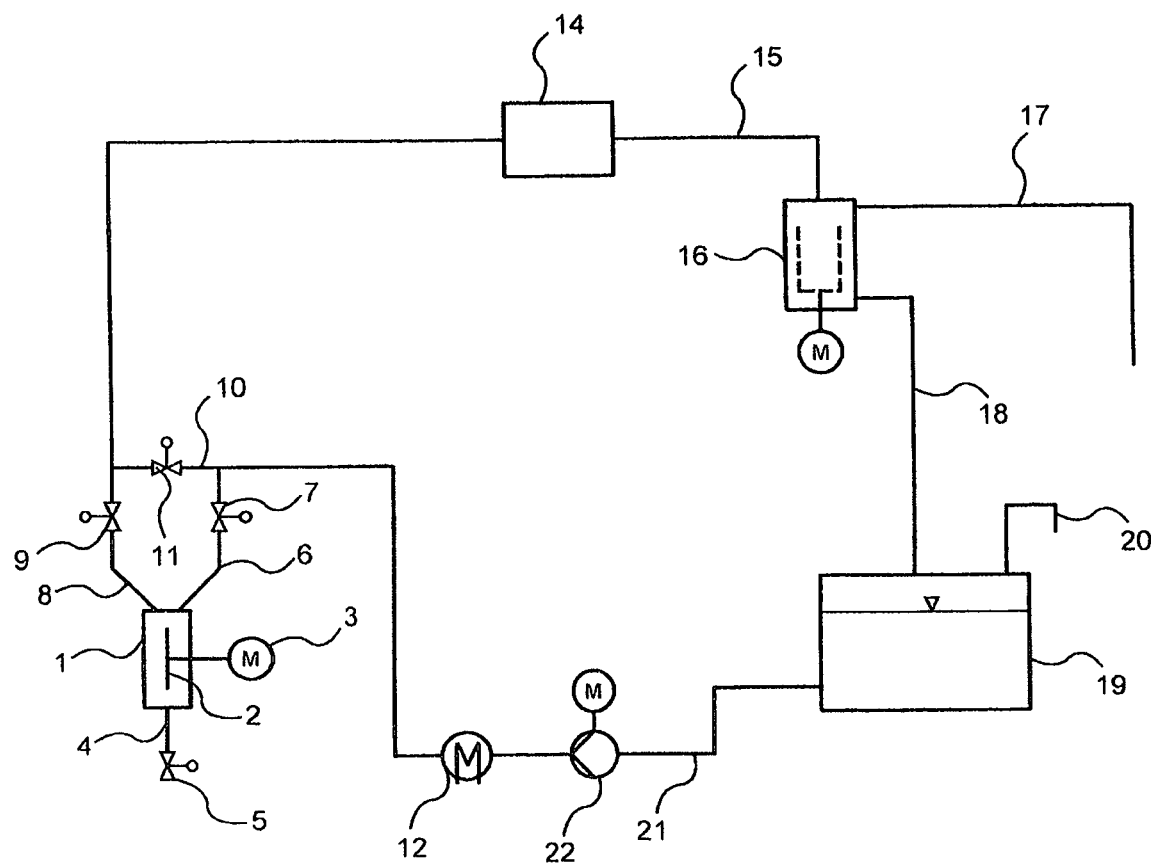

| | | | |
|---|---|---|---|
| 3,555,144 A * | 1/1971 | Pazar et al. | 424/10.3 |
| 3,564,650 A | 2/1971 | Irving | |
| 3,770,663 A * | 11/1973 | Ueki et al. | 521/60 |
| 4,123,606 A * | 10/1978 | Malhotra | 528/499 |
| 4,537,949 A | 8/1985 | Schmidt et al. | |
| 4,540,772 A | 9/1985 | Pipper et al. | |
| 4,606,873 A * | 8/1986 | Biglione et al. | 264/53 |
| 4,850,835 A * | 7/1989 | Rudolph | 425/67 |
| 5,052,426 A * | 10/1991 | Kasper | 137/14 |
| 5,605,937 A | 2/1997 | Knaus | |
| 5,609,892 A | 3/1997 | Garcia et al. | |
| 5,674,973 A | 10/1997 | Pipper et al. | |
| 5,895,617 A | 4/1999 | Mizuguchi et al. | |
| 6,052,919 A | 4/2000 | Stark | |
| 6,340,713 B1 | 1/2002 | Gluck et al. | |
| 6,342,540 B1 | 1/2002 | Gluck et al. | |
| 2002/0146509 A1 * | 10/2002 | Kodokian et al. | 427/222 |
| 2004/0009254 A1 * | 1/2004 | Eloo et al. | 425/311 |
| 2005/0140039 A1 * | 6/2005 | Casalini | 264/51 |
| 2005/0154183 A1 | 7/2005 | Ekart et al. | |
| 2005/0156344 A1 | 7/2005 | Dietzen et al. | |
| 2005/0167876 A1 | 8/2005 | Kreyenborg | |

FOREIGN PATENT DOCUMENTS

| | | |
|---|---|---|
| DE | 4321683 A1 | 1/1995 |
| DE | 19813108 A1 | 9/1999 |
| DE | 102004034516 A1 | 2/2006 |
| EP | 0126459 A2 | 11/1984 |
| EP | 0129195 A2 | 12/1984 |
| EP | 0129196 A2 | 12/1984 |
| EP | 0305862 A1 | 3/1989 |
| EP | 0924041 A1 | 6/1999 |
| EP | 1522395 A2 | 4/2005 |
| FR | 2009426 A1 | 2/1970 |
| JP | 01-168404 A | 7/1989 |
| JP | 61-36176 A | 5/1994 |
| JP | 73-14438 A | 12/1995 |
| JP | 09-221562 A | 8/1997 |
| JP | 10-095015 A | 4/1998 |
| WO | WO-01/10622 A1 | 2/2001 |
| WO | WO-03/053651 A1 | 7/2003 |
| WO | WO-03/106544 A2 | 12/2003 |

OTHER PUBLICATIONS

"Pelletizing: choosing an appropriate method," Plastics Additives & Compounding, Jul./Aug. 2004, pp. 22-26.

German Wikipedia article "Druckausgleich," (May 12, 2011). (Article is not in English; cited in opposition filed in Europe).

Schäfer, W., "Granulieren von Thermoplasten: Systeme im Verleich / Jahrestagung Aufbereitungstechnik, Baden-Baden 24. under 25. Nov. 1999;" Düsseldorf: VDI-Verlag 1999. (Article is not in English; cited in opposition filed in Europe).

* cited by examiner

FIG.2.1
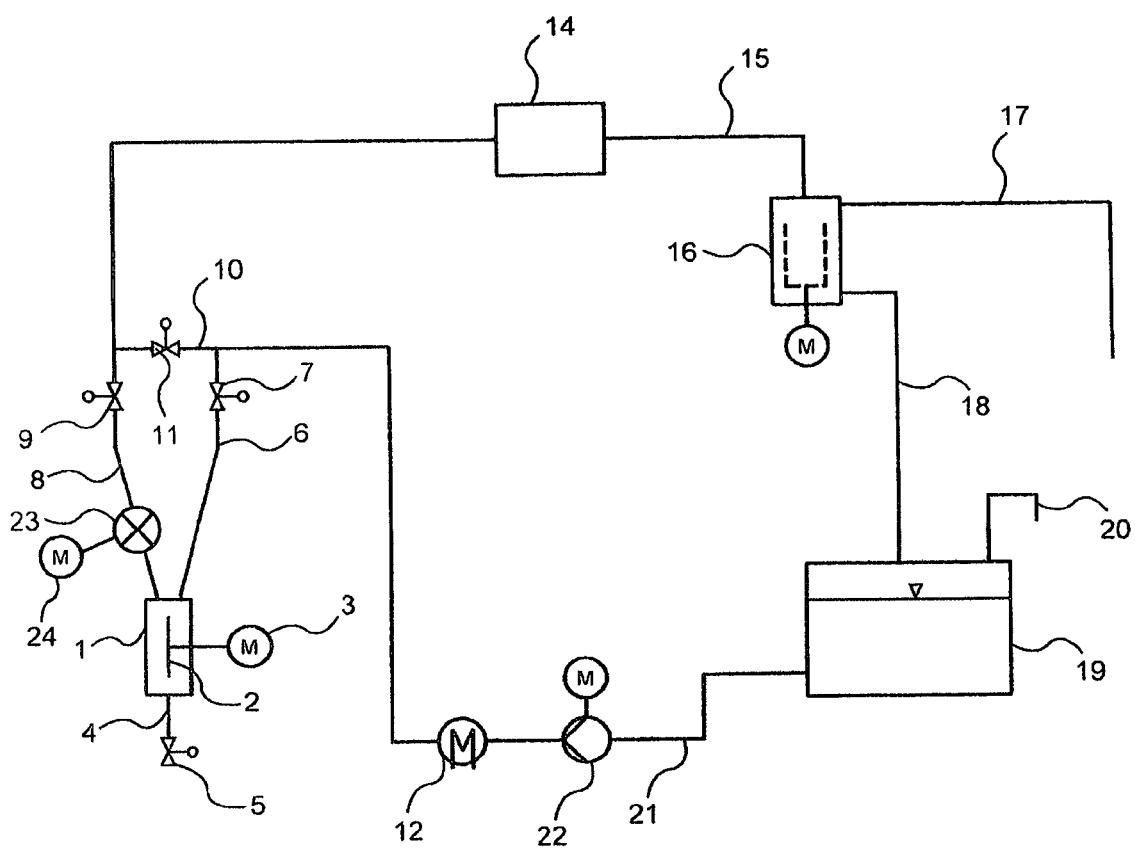

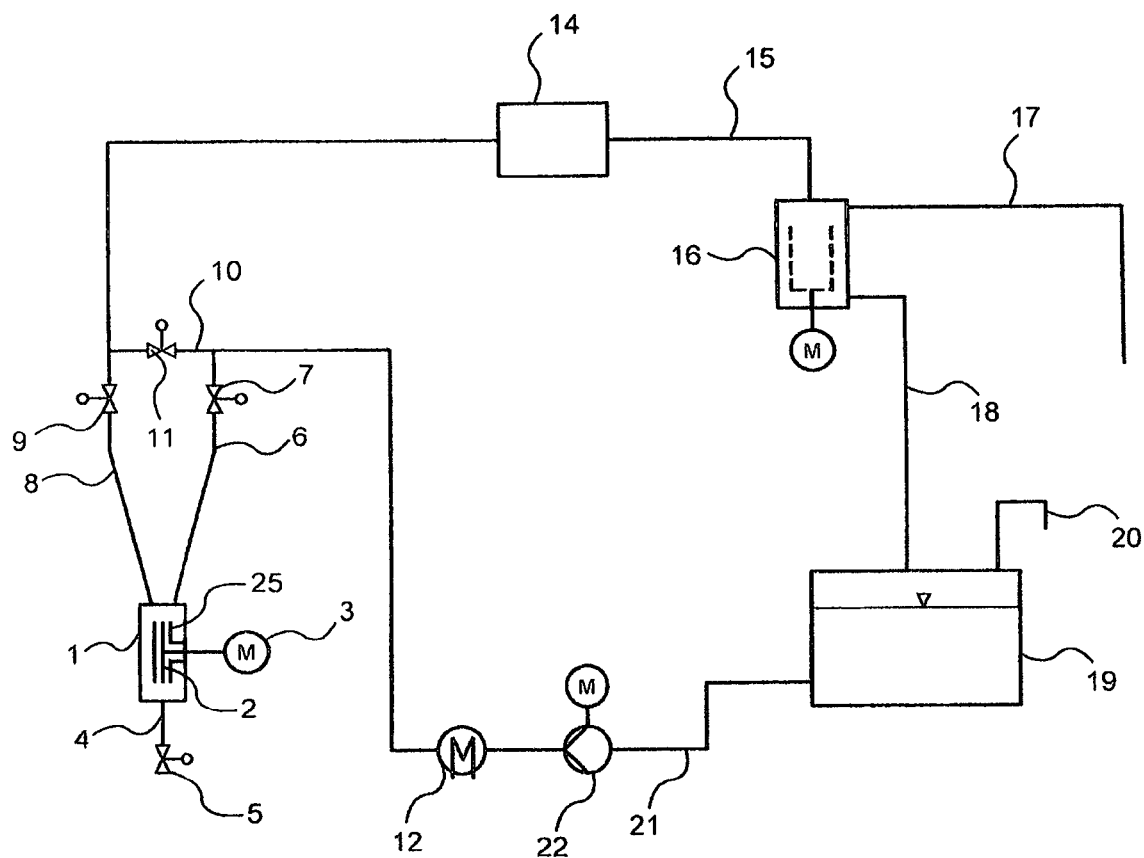
FIG.2.2

FIG.5.1
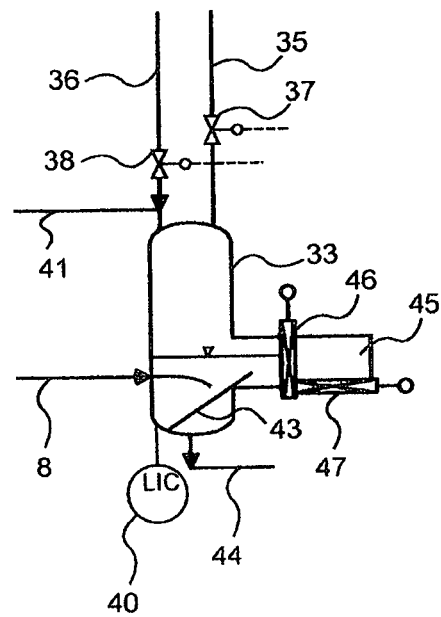
FIG.5.2
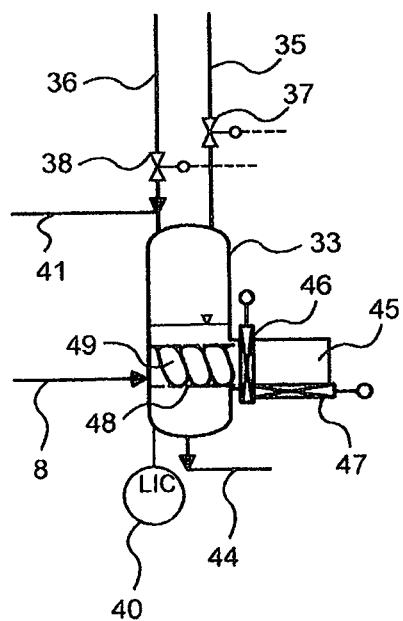

FIG.5.3
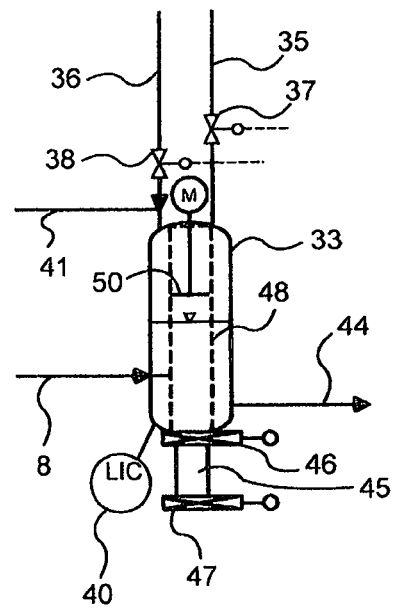
FIG.5.4
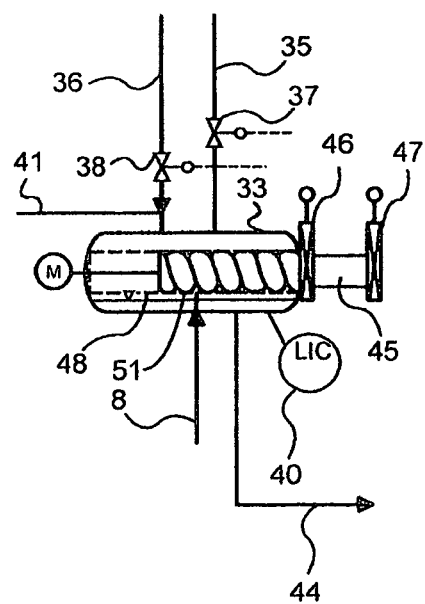

METHOD AND DEVICE FOR GRANULATING POLYMER MELTS CONTAINING BLOWING AGENT

RELATED APPLICATIONS

This application is a national stage application (under 35 U.S.C. 371) of PCT/EP2007/052441, filed Mar. 15, 2007, which claims benefit of European application 06111521.8, filed Mar. 22, 2006.

The invention relates to a process and an apparatus for pelletizing polymer melts comprising blowing agent in a pelletizing chamber through which a liquid flows, its pressure being above the ambient pressure.

Another term generally used for the pelletizing process is underwater pelletizing, since water is generally used as liquid flowing through the pelletizing chamber.

By way of example, the underwater pelletizing process is used when pellets are produced from plastics comprising blowing agent. The elevated pressure in the pelletizing chamber ensures that the plastic does not expand during the pelletizing process. With plastics comprising blowing agent, it is generally the case that blowing agents are present in the polymer melt from which the pellets are manufactured. There can also be reaction residues present in the polymer melt, e.g. water from the polycondensation reaction.

By way of example, a process for producing plastics pellets comprising blowing agent is known from EP-A 0 305 862. In that process, a polymer base material or a polymer mixture is fed to an extruder and melted in the extruder. The extruder has an injector for addition of a blowing agent to the melt. This blowing agent is added under pressure. The melt, with the blowing agent dissolved therein, is pelletized in a pelletizing chamber through which water flows. The pellets are entrained by the stream of water and introduced into a dryer in which the pellets are dried. Suitable polymers mentioned by way of example are aromatic alkenyl polymers, such as polystyrene, styrene-maleic anhydride copolymer, polycarbonate, polyester, polyetherimide, polysulfone, and polyphenyl ether.

WO-A 03/106544 discloses a process for producing styrene polymers which comprise blowing agent and whose molar mass $M_W$ is more than 170 000 g/mol. The styrene polymer melt here is pelletized underwater at a pressure in the range from 1 to 10 bar.

Another process in which pellets comprising blowing agent are produced from a thermoplastic polymer is known from EP-B 0 126 459. In this process, the polymer is first extruded, and a blowing agent is added, and the extruded polymer melt is then pelletized in a liquid.

WO 01/10622 describes production of porous pellets of a prepolymer based on (co)polyester carbonates. Here again, the pelletizing process is carried out in a pelletizing chamber in which water is present.

The pellets are usually isolated from the water at ambient pressure in the underwater pelletizing process. For this, the water in which the pellets are present first has to be depressurized. This generally takes place via reduction of cross section in a valve, e.g. in a pinch valve.

Agglomerates can generally be produced during the pelletizing process. A disadvantage of all the processes known from the prior art is that these agglomerates can block the throttle element utilized for pressure control. The result of this can be sudden pressure variations and flow variations in the pelletizing chamber. This adversely affects the pelletizing process and impairs the quality of the pellets.

It is therefore an object of the invention to provide a process which avoids the variations known in processes disclosed in the prior art in pelletizing-chamber pressure and in pelletizing-chamber flow.

The object is achieved via a process for pelletizing polymer melts in a pelletizing chamber through which a liquid of a liquid circuit flows, its pressure being above the ambient pressure, where, in a first step, the polymer melt is injected into the pelletizing chamber, in a second step the polymer melt is cut via a cutting apparatus into individual pellets and, in a third step, the pellets produced in the pelletizing process are discharged with the liquid from the pelletizing chamber and are then isolated from the liquid. This process also comprises at least one of the following steps:

(a) comminution of agglomerates produced during the pelletizing process or of pellets which exceed a prescribed maximum size, in a comminuting machine downstream of the pelletizing chamber or in a comminuting unit downstream of the cutting apparatus, in the pelletizing chamber, (b) depressurization of the pellet-loaded liquid in a depressurizing machine to a lower pressure level, (c) depressurization of the liquid in a throttle apparatus to the lower pressure level, where there is, upstream of the throttle apparatus, a pressure-equalizing container which keeps the pressure and the flow through the pelletizing chamber in essence constant.

(d) isolation of the pellets from the liquid, without any prior depressurization of the liquid with the pellets which it comprises, where the throttle apparatus used in step (c) can also be the depressurizing machine of step (b) or a throttle valve.

The polymer melt is preferably injected continuously into the pelletizing chamber. This generally takes place with the aid of an extruder or of a melt pump. According to the invention, a liquid flows through the pelletizing chamber. The pressure of this liquid is above the ambient pressure. The pressure of the liquid in the pelletizing chamber is generally from 1 to 50 bar, preferably in the range from 1.5 to 30 bar, and in particular in the range from 2 to 20 bar. The temperature of the liquid which flows through the pelletizing chamber is preferably in the range from 0 to 200° C., preferably in the range from 5 to 90° C., in particular from 10 to 70° C. The maximum temperature of this liquid depends on the polymer to be pelletized.

According to the invention, in normal operation the liquid floods the pelletizing chamber. The result of this is that the polymer melt injected into the pelletizing chamber passes into a liquid environment. An advantage of injecting the polymer melt into a liquid environment is that liquids generally have higher heat capacity and higher thermal conductivity than gases. A result of this is that more heat can be dissipated from the polymer melt than in a gaseous environment, and the melt therefore cools more rapidly. Before the cooling of the polymer melt injected into the pelletizing chamber has proceeded sufficiently far for it to have solidified, the melt is cut into pellets. This cutting generally takes place using a rapidly rotating knife bearing on a die plate, the polymer melt being pressed through the individual dies of the die plate.

After the cutting process, the pellets continue to cool in the liquid. In order to ensure continuous operation, the pellets are discharged with the liquid flow out of the pelletizing chamber.

Once the pellets have been discharged from the pelletizing chamber, they are isolated from the liquid. This isolation can take place via low-pressure separation at ambient pressure or via high-pressure separation. This high-pressure separation takes place at a pressure which is in essence the same as that of the pelletizing process. The expression "in essence the same pressure" takes account of the fact that although no depressurization of the liquid takes place within the liquid circuit, the pressure of the liquid nevertheless falls via pressure losses in the pipelines or system components.

For conducting the low-pressure separation process, it is first necessary to depressurize the liquid comprising pellets. In one first embodiment, this liquid is depressurized in a throttle apparatus designed as a depressurizing machine.

Examples of suitable depressurizing machines are turbines, pumps, or rotating sluice valves. Alongside these depressurizing machines, any other machine known to the person skilled in the art which converts the pressure of a liquid into energy is also suitable. The flow cross section within the depressurizing machine preferably remains unchanged in this process. A constant flow cross section ensures that the depressurizing machine does not become blocked via agglomerates which can form during pelletizing of the plastics melt.

In one embodiment, the depressurizing machine comprises at least one pump, the arrangement of the at least one pump being such that its direction of conveying opposes the direction of conveying of an upstream pump. In this installation, the pump whose direction of conveying opposes the direction of flow of the liquid circuit generates a counterpressure, and the pump whose direction of conveying is in the direction of flow overcomes this pressure. The depressurizing machine can also comprise two pumps, where the arrangement of the pumps is such that downstream of a first pump which conveys in the direction of flow of the liquid circuit there is a second pump which has a lower power rating than the first pump, the direction of conveying of the second pump being the same as or opposed to the direction of conveying of the first pump.

In another embodiment, the depressurizing machine comprises at least one forced-conveying pump or turbine via which the pressure level of the entire liquid charged is lowered to the desired lower pressure level. This is achieved by way of example via braking of the pump or operation of a generator or of another apparatus which dissipates energy from the system.

In a second embodiment, the pressure in the pelletizing chamber is kept in essence constant via use of a pressure-equalizing container and of a downstream throttle apparatus. For the purposes of the present invention, "in essence constant" means that the pressure container ensures that the extent to which the pressure in the pelletizing chamber rises or falls in comparison with the operating pressure is preferably not more than at most 5 bar, with preference 2 bar, in particular 1 bar. The pressure equalization also causes the flow rate to remain in essence constant.

An advantage of use of a pressure-equalizing container is that if the throttle apparatus becomes blocked by agglomerated pellets, the rising pressure is accumulated in the pressure-equalizing container, and the pelletizing chamber therefore continues to operate with in essence constant pressure and flow.

The pressure in the pressure-equalizing container is preferably kept constant by means of a gas, where, in order to increase the pressure, gas under pressure is introduced into the pressure-equalizing container and, in order to reduce the pressure, gas is dissipated from the pressure-equalizing container. Examples of suitable gases are air, nitrogen, or noble gases. Air or nitrogen is particularly preferred.

According to the invention, when a pressure-equalizing container is used, keeping the pressure in the pelletizing chamber in essence constant, it is possible to use, as downstream throttle apparatus, a valve or a faucet with alterable cross section. If a valve with alterable cross section is used, an example of this valve is a plug valve. As an alternative, a depressurizing machine as described above can be used as throttle apparatus.

The pressure container also acts as a coarse separator which can accumulate agglomerates. The separation method used here is a sieve apparatus or filter apparatus. For removal of the coarse agglomerates from the pressure container, this preferably has an attached discharge apparatus. Static or rotating sluice valves, e.g. a rotary-vane sluice valve, are a suitable discharge apparatus. It is also possible to use any other discharge apparatus which can remove solid from a pressurized container.

Both in the high-pressure separation process and in the low-pressure separation process, the pellets are separated in a solids separator from the liquid. Examples of suitable solids separators are hydrocyclones, filters, or centrifuges. However, it is also possible to use any other solids separator which is known to the person skilled in the art and which appears suitable.

In the high-pressure separation process, the pellets are generally removed from the solids separator by way of a sluice valve. This ensures that no pressure drop takes place in the liquid circuit by virtue of the removal of the pellets.

An example of a suitable sluice valve for removal of the pellets during the high-pressure separation process is a rotary-vane sluice valve or a chamber sluice valve.

The inventive process is used for pelletizing polymers comprising blowing agent. To prevent the polymer comprising blowing agent from foaming during the pelletizing process, the pelletizing process takes place under pressure. In this process, the blowing agent is included within the polymer. In the case of polymers which comprise blowing agent and which can be used for production of foams, the foaming can then take place in a further processing step, when the polymer is reheated to a temperature above the softening point.

For the purposes of the present invention, examples of polymers comprising blowing agent are styrene (co)polymers comprising blowing agent, polycarbonate comprising blowing agent, and polyamide comprising blowing agent, particular preference being given to styrene (co)polymers comprising blowing agent, and also polymers which can still comprise components that can be lost by evaporation, examples being monomers or water from the production process.

Preferred styrene (co)polymers are glass-clear polystyrene (GPPS), impact-modified polystyrene (HIPS), anionically polymerized polystyrene or anionically polymerized impact-modified polystyrene (AIPS), styrene-α-methylstyrene copolymers, acrylonitrile-butadiene-styrene copolymers (ABS), styrene-acrylonitrile (SAN), acrylonitrile-styrene-acrylate (ASA), methacrylate-butadiene-styrene (MBS), methyl methacrylate-acrylonitrile-butadiene-styrene (MABS) copolymers, or a mixture thereof. Polyphenylene ether (PPE) can also be admixed with the styrene (co)polymers mentioned.

In order to improve mechanical properties or heat resistance, the styrene (co)polymers mentioned can be blended with thermoplastic polymers, such as polyamides (PA), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones, or polyether sulfides (PES), or a mixture thereof generally in proportions of up to at most 30% by weight in total, preferably in the range from 1 to 10% by weight, based on the polymer melt, if appropriate with use of compatibilizers. Within the quantitative ranges mentioned, other mixtures are also possible with, for example, hydrophobically modified or functionalized polymers, or with oligomers, with rubbers, such as polyacrylates or polydienes, e.g. styrene-butadiene block copolymers, or with biodegradable aliphatic or aliphatic/aromatic copolyesters.

It is also possible to admix recycled polymer materials from the thermoplastic polymers mentioned, in particular styrene (co)polymers and styrene (co)polymers comprising blowing agent (EPS) with the styrene (co)polymer melt, where the amounts admixed, generally at most 30% by weight, in particular from 1 to 10% by weight, do not substantially impair the properties of the materials.

The styrene (co)polymer melt comprising blowing agent generally comprises one or more blowing agents homogeneously dispersed in a total proportion of from 2 to 10% by weight, based on the styrene (co)polymer melt comprising blowing agent. Suitable blowing agents are the physical blowing agents usually used in EPS, examples being aliphatic hydrocarbons having from 2 to 7 carbon atoms, alcohols, ketones, ethers, or halogenated hydrocarbons. Preference is given to use of isobutane, n-butane, isopentane, or n-pentane.

To improve foamability, finely dispersed droplets of internal water can be introduced into the styrene (co)polymer matrix. One possible method for this is addition of water to the molten styrene (co)polymer matrix. The addition preferably takes place prior to blowing agent feed. Homogeneous dispersion of the water can be achieved by means of kneading elements or static mixers.

The amount of water added is selected in such a way that an expansion capability $\alpha$, defined as bulk density prior to foaming/bulk density after foaming, is at most 125 for the styrene (co)polymers (EPS) comprising blowing agent. A sufficient amount of water is generally from 0.05 to 1.5% by weight, based on the styrene (co)polymer.

Styrene (co)polymers (EPS) whose internal water is at least to an extent of 90% in the form of droplets of internal water whose diameter is in the range from 0.5 to 15 μm foam to give foams with a sufficient cell number and a homogeneous foam structure.

The styrene (co)polymer melt can moreover receive additions of additives, nucleating agents, plasticizers, active ingredients, e.g. fungicides, pesticides, herbicides, soluble or insoluble inorganic and/or organic dyes and pigments, e.g. IR absorbers, such as carbon black, graphite, or aluminum powder, or else fillers such as chalk, talc, added together or with spatial separation. The amounts generally added of the additives are in the range from 0.01 to 30% by weight, preferably in the range from 1 to 10% by weight. For homogeneous microdispersion of the additives in the styrene (co)polymer, it can be advantageous, especially in the case of polar additives, to use a dispersing agent, e.g. organosilanes or maleic-anhydride-grafted styrene polymers. Preferred plasticizers are mineral oils, oligomeric styrene polymers, and phthalates in amounts of from 0.05 to 10% by weight, based on the styrene (co)polymer.

The relatively-high-molecular-weight styrene (co)polymers permit use of a temperature in the range from 140 to 300° C., preferably in the range from 160 to 240° C., to convey the styrene (co)polymer melt comprising blowing agent through the die plate. There is no need for cooling to the glass transition temperature region.

The inventive process is moreover suitable for producing pellets which retain a content of low-boiling substances. These are preferably polyamides. Preferred polyamides are formed via reactions of aqueous solutions of salts derived from $\alpha,\omega$-alkanedicarboxylic acids having from 6 to 12 carbon atoms and $\alpha,\omega$-alkanediamines having from 6 to 12 carbon atoms, in particular from those having a straight carbon chain. Examples of suitable dicarboxylic acids are azelaic acid, adipic acid, suberic acid, sebacic acid, or decanedicarboxylic acid, terephthalic acid, or naphthalenedicarboxylic acid. Preferred $\alpha,\omega$-alkane-dicarboxylic acids have from 6 to 10 carbon atoms.

Examples of suitable diamines are hexamethylenediamine, octamethylenediamine, or decamethylenediamine, bis(4-aminocyclohexyl)-methane, bis(4-amino-3-methylcyclohexyl)methane, bis(4-aminocyclohexyl)-2,2-propane. Preferred $\alpha,\omega$-alkanediamines have from 6 to 10 carbon atoms.

It is also possible to make concomitant use of lactams, in particular caprolactam, for production of copolyamides.

Other suitable polyamides are those produced from a mixture composed of at least one lactam and water and also, if appropriate, other monomer units and/or conventional additives and fillers, under polyamide-forming conditions. Production of these polyamides is known by way of example from DE-A 43 21 683.

Examples of a suitable lactam are caprolactam, oenantholactam, caprylolactam, and laurolactam, or else a mixture of these, caprolactam being preferred.

Other monomer units which can be used are by way of example dicarboxylic acids, such as alkanedicarboxylic acids having from 6 to 12 carbon atoms, in particular from 6 to 10 carbon atoms, e.g. adipic acid, pimelic acid, suberic acid, azelaic acid, or sebacic acid, or else terephthalic acid or isophthalic acid, diamines, such as $C_4$-$C_{12}$-alkyldiamines, in particular having from 4 to 8 carbon atoms, e.g. hexamethylenediamine, tetramethylenediamine, or octamethylenediamine, or else m-xylylenediamine, bis(4-aminophenyl)methane, bis(4-aminophenyl)-2,2-propane, or bis(4-aminocyclohexyl)methane, or else a mixture of dicarboxylic acids and diamines, each in any desired combination, but advantageously in equivalent amounts, e.g. hexamethylenediammonium adipate, hexamethylenediammonium terephthalate, or tetramethylenediammonium adipate, preferably hexamethylenediammonium adipate and hexamethylenediammonium terephthalate, in amounts in the range from 0 to 60% by weight, preferably from 10 to 50% by weight, based on the entire amount of monomers. Particular industrial importance has been achieved by polycaprolactam and polyamides composed of caprolactam, hexamethylenediamine, and also adipic acid, isophthalic acid, and/or terephthalic acid.

In one preferred embodiment, caprolactam and hexamethylenediammonium adipate ("AH salt") are used, the AH salt being used in the form of an aqueous solution. The molar ratio of caprolactam to AH salt is usually in the range from 0.05:99.95 to 20:80, preferably from 5:95 to 15:85.

Conventional additives and fillers that can be used are pigments, such as titanium dioxide, silicon dioxide, or talc, chain regulators, such as aliphatic and aromatic carboxylic acids and aliphatic and aromatic dicarboxylic acids, e.g. propionic acid or terephthalic acid, stabilizers, such as cuprous (1) halides and alkali metal halides, nucleating agents, such as magnesium silicate or boron nitride, catalysts, such as phosphorous acid, and also antioxidants, in amounts in the range from 0 to 5% by weight, preferably from 0.05 to 1% by weight, based on the total amount of monomers. The additives are generally added prior to the pelletizing process and prior to, during, or after, preferably after, the polymerizing process.

According to the invention, suitable polyamides generally have a viscosity number of from 30 to 120 ml/g, preferably from 50 to 90 ml/g, determined in 0.5% strength by weight solution in 96% strength by weight sulfuric acid at 25° C. to ISO 307.

Examples of polyamides which can be pelletized via the inventive process are (the monomers being stated in brackets):
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA MXD6 (m-xylylenediamine, adipic acid)
PA TMDT (trimethylhexamethylenediamine, terephthalic acid)

Preferred polyamides are polyhexamethyleneadipamide (PA 66) and polyhexamethylenesebacamide (PA 610), and also nylon-6/6,6 copolyamides, in particular with from 5 to 50% by weight content of caprolactam units. Particular preference is given to PA 66 and to nylon-6/6,6 copolyamides.

Other suitable materials are semiaromatic copolyamides, such as PA 6/6T and PA 66/6T, where the triamine content of these is less than 0.5% by weight, preferably less than 0.3% by weight. Production of the semiaromatic copolyamides with low triamine content can follow the processes described by way of example in EP-A 129195 and EP-A 129196.

The die plate is preferably heated at least to the temperature of the polymer melt comprising blowing agent. The temperature of the die plate is preferably in the range from 20 to 100° C. above the temperature of the polymer melt comprising blowing agent. This inhibits formation of polymer deposits in the dies and ensures that the pelletizing process is free from disruption.

To obtain EPS pellet sizes commonly encountered in the market, the diameter (D) of the die orifices at the exit from the die should be in the range from 0.2 to 1.5 mm, preferably in the range from 0.3 to 1.2 mm, particularly preferably in the range from 0.3 to 0.8 mm. Even after die swell, this permits controlled setting of pellet sizes below 2 mm, in particular in the range from 0.4 to 1.6 mm.

In one embodiment, there is, downstream of the pelletizing chamber, a comminuting machine in which agglomerates and/or pellets which are produced in the pelletizing process and whose size exceeds a prescribed maximum size are comminuted. The comminuting machine preferably comprises a rapidly rotating knife which chops the pellets during flow through the comminuting machine.

In one embodiment, for start-up of the pelletizing apparatus the pelletizing chamber is flooded with a pressurized gas. This avoids expansion of the polymer melt comprising blowing agent during start-up in the pelletizing chamber. As soon as the polymer melt reaches the die plate on which the pellets are cut, the gas in the pelletizing chamber is displaced by the liquid of the liquid circuit. In this process, the pressure to which the liquid is subject is preferably only very slightly higher than that of the gas. Flooding of the pelletizing chamber prior to start of the pelletizing process is not possible, since in that case pressurized liquid penetrates into the die plate and thus solidifies the polymer melt. The die orifices become blocked.

If the pressure in the liquid circuit is kept constant by way of the pressure container, it is preferable that the gas used to retain the pressure in the pressure container is used to pressurize the pelletizing chamber for start-up. As soon as the pelletizing chamber is flooded, a gas plug then forms and passes with the flow into the pressure container.

The invention moreover comprises an apparatus for pelletizing polymer melts, comprising a pelletizing chamber flooded with a liquid, its pressure being above the ambient pressure, and comprising a pressure pump for generating the required pressure, wherein at least one of the following features has been provided:

(a) downstream of the pelletizing chamber there is a comminuting machine, or downstream of a cutting apparatus within the pelletizing chamber there is a comminuting unit, (b) downstream of the pelletizing chamber there is a throttle apparatus designed as a depressurizing machine for adjusting the pressure in the pelletizing chamber, and downstream of this, a solids separator in which the pellets are isolated from the liquid, (c) downstream of the pelletizing chamber there is a pressure-equalizing container and, downstream of this, a throttle apparatus for adjusting the counterpressure, where the pellets are removed in a solids separator which is downstream of the throttle apparatus, (d) downstream of the pelletizing chamber there is a solids separator in which the pellets are isolated from the liquid at the pressure prevailing in the pelletizing chamber, so that no depressurization to ambient pressure takes place in the liquid circuit.

For the purposes of the present invention, a depressurizing machine is any apparatus at which the pressure is reduced, while the amount of any reduction in the cross section in the direction of flow is at most 50%, preferably at most 20%, in particular zero. The general method used here for pressure reduction is that the liquid is depressurized with simultaneous dissipation of energy. Examples of suitable depressurizing machines are turbines, pumps, or rotating sluice valves. The design of the turbines, pumps, or rotating sluice valves is preferably such that the flow cross section does not alter within the apparatus. Examples of preferred pumps are co-current displacement pumps or counter-current centrifugal pumps.

If, downstream of the pelletizing chamber, there is a pressure-equalizing container in order to keep the pressure in the liquid circuit in essence constant, another suitable throttle apparatus is a throttle valve. A suitable throttle valve is any of the valves in which the pressure of the liquid is reduced to the lower pressure level. Examples of suitable valves are slide valves, control valves, plug valves, or pinch valves. A plug valve is particularly preferred as pressure-retention valve.

According to the invention, the throttle apparatus here has two functions. Firstly, the pressure of the liquid in the pelletizing chamber is kept constant via setting of the throttle apparatus, and secondly the liquid comprising pellets is depressurized in the throttle apparatus to ambient pressure, so that the pellets can then be isolated from the liquid at ambient pressure.

The pellets are generally isolated in a solids separator. This separation takes place either after depressurization of the liquid comprising pellets to ambient pressure or at a pressure which is in essence the same as that of the liquid in the pelletizing chamber. Essentially the same pressure here means that the pressure falls slightly by virtue of the pressure loss in pipelines and system components within the liquid circuit. In this case, the liquid is circulated by a circulating pump. At the same time, the circulating pump serves to equalize the pressure loss in the liquid circuit.

Any of the solids separators known to the person skilled in the art is suitable for the solids separation process for isolation of the pellets comprising blowing agent. Preferred solids separators are hydrocyclones, centrifuges, filters, or sieves. A suitable filter is any filter whose pore size is smaller than the diameter of the smallest pellets which the liquid comprises.

If the solids separation process takes place at a pressure which is in essence the same as that at which the pelletizing process is also carried out, it is necessary to discharge the solid from the solids separator without any resultant reduction of the pressure in the solids separator. The preferred method of solids discharge is then by way of a discharge apparatus, such as a rotary-vane sluice valve or a chamber sluice valve.

In another embodiment, there is another comminuting machine downstream of the pelletizing chamber. In the comminuting machine, pellets which by way of example as a result of agglomeration exceed a maximum size are comminuted. A suitable comminuting machine here is any apparatus which can comminute pellets comprised in liquid. The comminuting machine preferably comprises a rotating knife which rotates on a cutting plate. Apertures have been designed in the cutting plate, their diameter being greater than the largest pellet diameter to be assumed. When the pellets flow through the cutting plate they are comminuted by the rapidly rotating knife.

When the pressure-equalizing container is used in order to keep constant pressure in the apparatus for pelletizing polymer melts, pressure equalization takes place with the aid of a gas which is inert toward the liquid and toward the pellets. To this end, a pressure gas line and an exhaust gas line open into the pressure-equalizing container and each of these comprises a control valve by way of which the pressure in the pressure-equalizing container is kept constant. As soon as the pressure in the liquid circuit and therefore in the pressure container rises, the control valve in the exhaust-gas line opens and gas can flow out of the pressure-equalizing container. This avoids any increase in the pressure in the liquid circuit. As soon as the pressure falls again, on the other hand, the control valve in the pressure gas line is opened and further pressurized gas can flow into the pressure container until the operating pressure has been regained. Another function of the controllable throttle apparatus, alongside pressure decrease, is keeping maximum constancy of liquid level in the pressure-equalizing container.

In order to ensure that the pelletizing chamber has been flooded with pressurized gas for start-up of the pelletizing process, one particularly preferred embodiment has, branching off from the pressure gas line, a line which has a shut-off valve and which opens into the liquid circuit in the region of the pelletizing chamber. When the shut-off valve is open, the gas can flow into the pelletizing chamber. As soon as the pelletizing chamber has been flooded with gas and operating pressure prevails in the pelletizing chamber, the shut-off valve is sealed. As soon as the polymer melt reaches the pelletizing chamber and the cutting procedure can begin in the pelletizing chamber, this chamber is flooded with the liquid. The gas then flows in the form of gas plug in the liquid line into the pressure-equalizing container, where the gas is re-isolated from the liquid circuit.

In one preferred embodiment, the pressure-equalizing container comprises a separator apparatus and, if appropriate, a discharge apparatus for solids particles. In this separator apparatus, agglomerates comprised in the liquid circuit are collected and isolated. An example of a preferred separator apparatus is a sieve insert or a mechanical cleansing apparatus. If a sieve insert is used, its design is such that there are apertures in the sieve insert which are negotiable by pellets whose size does not exceed a desired maximum pellet size, and such that larger pellets are intercepted.

Figure 3:
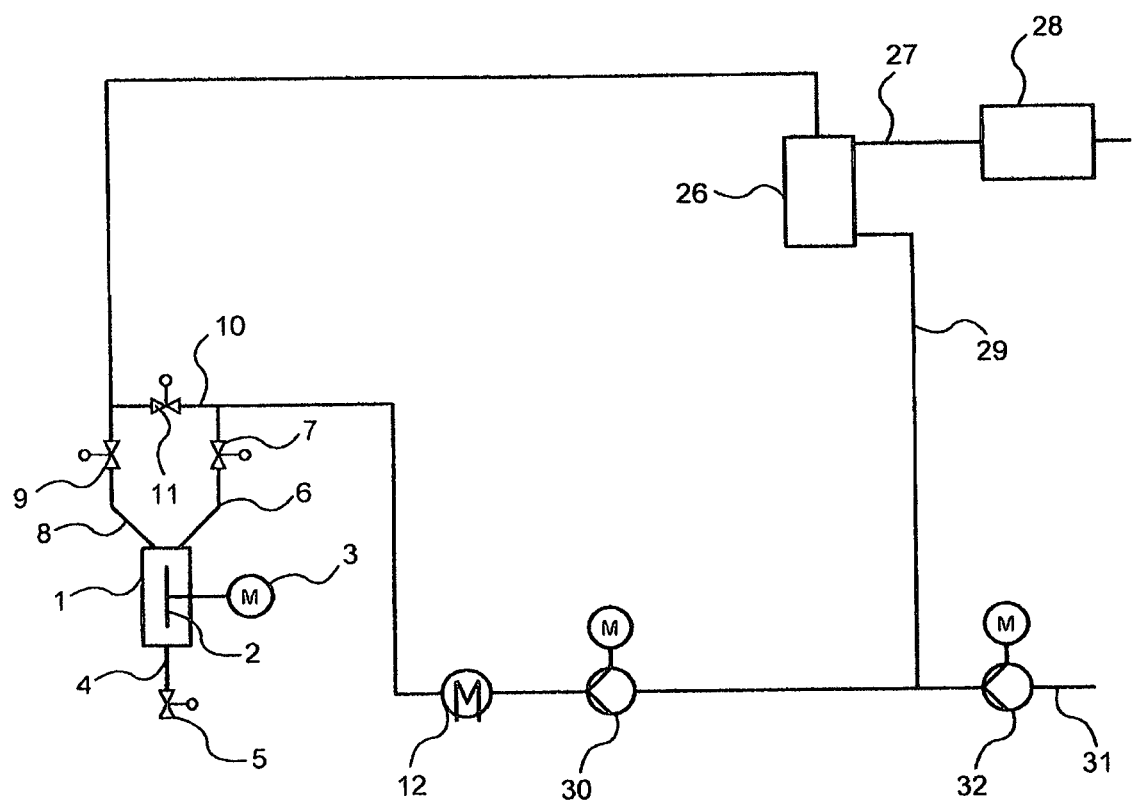
Figure 4:
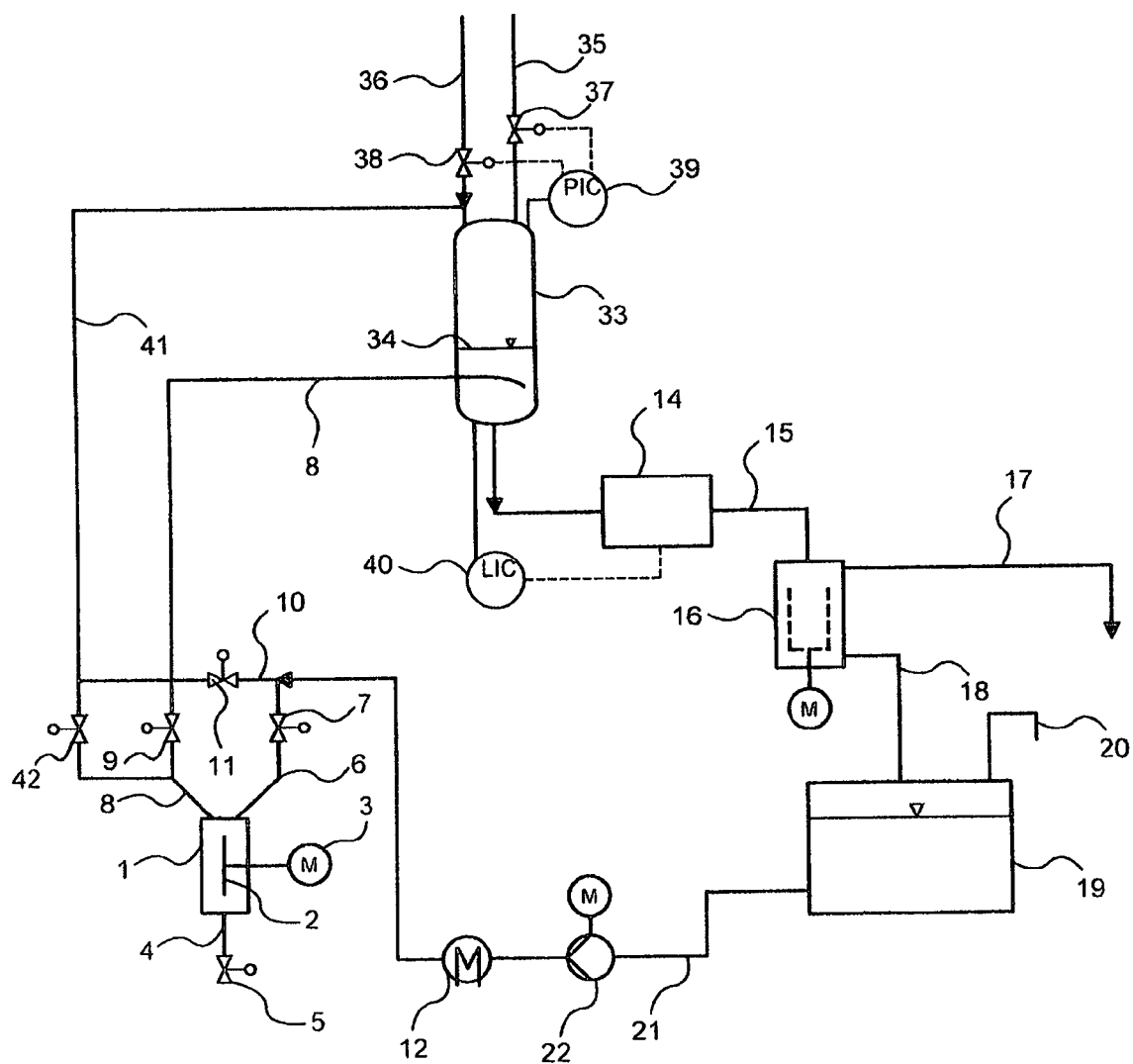

The invention is described in more detail below, using a drawing, in which:

FIG. 1 shows a process flow diagram for the inventive apparatus in a first embodiment, FIG. 2.1 shows a process flow diagram for the inventive apparatus in a second embodiment, FIG. 2.2 shows a process flow diagram for the inventive apparatus in a third embodiment, FIG. 3 shows a process flow diagram for the inventive apparatus in a fourth embodiment, FIG. 4 shows a process flow diagram for the inventive apparatus in a fifth embodiment, FIGS. 5.1-5.4 show pressure-equalizing containers in various embodiments.

FIG. 1 shows a process flow diagram for the inventive apparatus in a first embodiment. A polymer melt comprising blowing agent is introduced into a pelletizing chamber 1. In the pelletizing chamber 1, the polymer melt is cut into pellets. To this end, the rotating knife 2 is present in the pelletizing chamber 1.

The rotating knife 2 is driven with the aid of a motor 3. The knife 2 is preferably conducted on a die plate not shown here but designed with a large number of holes. The polymer melt is extruded through the holes of the die plate and is cut by the rotating knife 2 into pellets. By way of a line 4 which has a shut-off valve 5, it is possible to evacuate the pelletizing chamber 1. By way of a second line 61 which has a second shut-off valve 7, liquid is introduced into the pelletizing chamber 1 during start-up of the process. By way of a third line 8, which has a third shut-off valve 9, the liquid comprising the pellets which comprise blowing agent is drawn off from the pelletizing chamber 1. The second line 6 and the first line 8 have mutual connection by way of a fourth line 10, which has a fourth shut-off valve 11. Prior to start-up of the process, the second shut-off valve 7 has first been sealed, and the fourth shut-off valve 11 has been opened. The liquid does not therefore initially flow through the pelletizing chamber 1.

By way of the line 8, the liquid comprising pellets is introduced into a throttle apparatus 14. In the throttle apparatus 14, the liquid comprising pellets is depressurized to ambient pressure. The design of the throttle apparatus 14 here is preferably such that the cross section does not alter therein. The throttle apparatus 14 is preferably a depressurizing machine. An example of a suitable depressurizing machine is a turbine, a pump, or a rotating sluice valve.

The depressurized liquid comprising pellets is introduced by way of a feed 15 to a separator apparatus 16. An example of a suitable separator apparatus is a hydrocyclone, a centrifuge, or a filter. A centrifuge is illustrated as separator apparatus 16 in FIG. 1. The pellets emerge from the separator apparatus 16 by way of a removal line 17. The liquid is introduced by way of a line 18 to a liquid container 19. The liquid container 19 comprises an overflow 20 as pressure equalizer. From the liquid container 19, the liquid passes by way of a feed line 21 which has a pump 22, and by way of the second line 6 back into the pelletizing chamber 1. The design of the pump 22 here is such that the pressure of the liquid is increased in the pump from ambient pressure to the operating pressure of the pelletizing chamber 1. In order to permit setting of the temperature in the liquid circuit, in the embodiment illustrated here there is a heat exchanger 12 downstream of the pump 22.

FIG. 2.1 shows a process flow diagram of the inventive apparatus in a second embodiment. The second embodiment illustrated in FIG. 2.1 differs from the embodiment illustrated in FIG. 1 in that there is a further comminuting machine 23 downstream of the pelletizing chamber 1. The comminuting machine 23 comprises a rotating knife which is driven by a motor 24.

Instead of the further comminuting machine 23 it is also possible, as illustrated in FIG. 2.2, to have a further comminuting unit 25 in the pelletizing chamber 1 alongside the rotating knife 2. This comminuting unit 25 reduces formation of agglomerates.

FIG. 3 shows a process flow diagram of the inventive apparatus in a fourth embodiment.

In the embodiment illustrated in FIG. 3, the liquid which comprises the pellets is not depressurized prior to separation of the pellets. The embodiment illustrated in FIG. 3 therefore comprises no throttle apparatus 14. The pressurized liquid comprising the pellets is introduced into a separator apparatus 26. In the separator apparatus 26, the pellets are isolated from the liquid at operating pressure. The operating pressure here is in essence the same as that prevailing in the pelletizing chamber 1. The pellets from the separator apparatus 26 are introduced by way of a removal line 27 into a throttle apparatus 28. In the throttle apparatus 28, the stream comprising the pellets is depressurized to ambient pressure.

The liquid subject to operating pressure is reintroduced after removal of the pellets by way of a circulation line 29 which has a circulation pump 30, and by way of the second line 6, into the pelletizing chamber 1. The liquid is circulated with the aid of the circulating pump 30. At the same time, pressure loss arising in the pipelines and system components is equalized by way of the circulating pump 30. Liquid escaping from the liquid circuit is compensated for by way of a feed line 31 which comprises a pump 32. Pressure of the liquid is increased to operating pressure with the aid of the pump 32, before the liquid is introduced into the circulation line 29.

FIG. 4 illustrates a process flow diagram for a fifth embodiment of the inventive apparatus.

The embodiment illustrated in FIG. 4 has a pressure-equalizing container 33 between the pelletizing chamber 1 and the throttle apparatus 14. The pressure in the pelletizing chamber 1 is kept constant via the pressure-equalizing container by way of the third line 8. If, for example, agglomerated pellets block the throttle apparatus 14, the liquid level 34 rises in the pressure-equalizing container 33. As a result of this, gas located above the liquid in the pressure-equalizing container 33 is extracted from the pressure-equalizing container 33 by way of an exhaust-gas line 35. As soon as the pressure in the pressure-equalizing container 33 falls via a fall in the liquid level 34, an amount of gas sufficient to return the pressure to operating pressure is introduced by way of a pressure gas line 36 into the pressure-equalizing vessel 33 and simultaneously the flow cross section of the throttle apparatus 14 is altered by way of a liquid-level-regulating system 40 in such a way that the prescribed liquid level is regained in the pressure-equalizing container 33. This keeps the pressure and flow in essence constant in the pelletizing chamber 1. Because the pressure and flow in the pelletizing chamber 1 are in essence constant, no disruption of the pelletizing procedure occurs.

In the embodiment illustrated in FIG. 4, the throttle apparatus 14 used can comprise a depressurizing machine or a throttle valve known from the prior art. An example of a suitable throttle valve is a pinch valve.

In order to keep the pressure constant in the pressure-equalizing container 33, the exhaust-gas line 35 has a first control valve 37 and the pressure gas line 36 has a second control valve 38. Regulation takes place by way of a pressure control system 39. In order to keep a constant liquid level 34 in the pressure-equalizing container 33, there is also a level-regulating system 40. The throttle apparatus 14 is actuated by way of the level-regulating system 40. The design of the throttle apparatus 14 in this case is preferably such that it can be used to control the flow of liquid. As soon as the liquid level 34 in the pressure-equalizing container 33 rises, it is necessary to permit a larger amount of liquid to flow out of the pressure-equalizing container 33 by way of the throttle apparatus 14. If the liquid level 34 falls below a critical value, the throttle apparatus 14 has to permit a smaller amount of liquid to flow out of the pressure-equalizing container 33, so that the liquid level 34 rises again. Control valves are particularly suitable in this case as throttle apparatus.

In order to flood the pelletizing chamber 1 with gas for start-up of the pelletizing process, a gas line 41 branches off from the pressure gas line 36 after the control valve 38. The gas line can also branch off from the pressure-equalizing container 33 or from the other lines 35 associated with that gas space. The gas line 41 either opens directly into the pelletizing chamber 1 or, as illustrated in FIG. 4, opens into the third line 8 between the third shut-off valve 9 and second shut-off valve 7 and the pelletizing chamber 1. When the third shut-off valve 9 has been sealed, the pelletizing chamber 1 can thus be flooded with gas. As soon as the operating pressure in the pelletizing chamber 1 has been reached, a shut-off valve 42 in the gas line 41 is sealed. At the start of the pelletizing process, the juncture at which the polymer melt reaches the pelletizing chamber 1, the fourth shut-off valve 11 is sealed, and the second shut-off valve 7 and the third shut-off valve 9 are opened, thus permitting flow of liquid from the liquid container 19 by way of the feed line 21 into the pelletizing chamber 1. As the liquid flows in, it pushes the gas comprised in the pelletizing chamber 1 in the form of a gas plug by way of the third line 8 into the pressure-equalizing container 33. In the pressure-equalizing container 33, the gas separates from the liquid. As operation continues, a liquid circuit is operated by way of the third line 8, the supply line 15, the feed line 21, and the second line 6. Within this liquid circuit, the liquid is throttled to ambient pressure in the throttle apparatus 14 and recompressed to operating pressure by means of the pump 22. The pellets are isolated in the separator apparatus 16.

FIG. 5.1 illustrates a pressure-equalizing container 33 in a second embodiment.

For isolation of agglomerates and pellets whose size exceeds a minimum size, the pressure-equalizing container 33 has a sieve insert 43. To this end, the sieve insert 43 has been designed with apertures which retain agglomerates and large pellet particles. Pellets whose size is within the desired range can pass through the sieve insert 43, and are passed by way of a connecting line 44 to the throttle apparatus 14. The isolated agglomerates and pellets can be removed from the pressure-equalizing container 33 by way of a discharge apparatus 45. The discharge apparatus 45 comprises two flaps 46 and 47 which can be opened independently of one another. To avoid a fall in pressure in the pressure-equalizing container 33, the first flap 46 is first opened to remove the agglomerates and large pellets and the large pellets and the agglomerates can pass into the discharge apparatus 45. The first flap 46 is then closed and the second flap 47 is opened, thus removing the agglomerates and large pellets from the discharge apparatus 45.

In the embodiment illustrated in FIG. 5.2 of the pressure-equalizing container 33, this has a sieve insert 48 by way of which the large pellets and agglomerates are isolated. Within the sieve insert 48 there are guide plates 49 which guide the liquid comprising pellets from the third line 8, which opens into the pressure-equalizing container 33, in the direction of the sieve insert 48. Again, the large pellets and the agglomerates are discharged by way of the discharge apparatus 45.

In the embodiment illustrated in FIG. 5.3 of the pressure-equalizing container 33, the liquid 8 comprising the pellets is passed into the interior of the sieve insert 48. In the sieve insert 48 there is a piston plate 50, which can be moved in the direction of the discharge apparatus 45. With the aid of the piston plate 50, the large pellets and the agglomerates unable to pass through the sieve insert 48 are moved in the direction of the discharge apparatus 45. The smaller pellets and the liquid are discharged under pressure from the sieve insert 48. The large pellets and the agglomerates can then be removed from the pressure-equalizing container 33 by way of the discharge apparatus 45.

The embodiment illustrated in FIG. 5.4 of the pressure-equalizing container 33 has a rotatable screw 51 within the sieve insert 48. With the aid of the screw 51, the coarse pellets and the agglomerates are guided in the direction of the discharge apparatus 45. The coarse pellets and the agglomerates can be removed from the pressure-equalizing container 33 by way of the discharge apparatus 45. The pellets whose size is suitable to permit them to pass through the sieve insert 48 are passed with the liquid by way of the connecting line 44 in the direction of the throttle apparatus 14.

Alongside the embodiments illustrated in FIGS. 4 and 5.1-5.4 for the pressure-equalizing container 33, any other embodiment of the pressure-equalizing container 33 which can remove the coarse pellets and agglomerates from the liquid is also suitable.

KEY

1 Pelletizing chamber
2 Rotating knife
3 Motor
4 First line
5 First shut-off valve
6 Second line
7 Second shut-off valve
8 Third line
9 Third shut-off valve
10 Fourth line
11 Fourth shut-off valve
12 Heat exchanger
14 Depressurizing machine
15 Supply line
16 Separator apparatus
17 Removal line
18 Line
19 Liquid container
20 Overflow
21 Feed line
22 Pump
23 Comminuting machine
24 Motor
25 Comminuting unit
26 Separator apparatus
27 Removal line
28 Throttle apparatus
29 Circuit
30 Circulating pump
31 Feed line
32 Pump
33 Pressure-equalizing container
34 Liquid level
35 Exhaust-gas line
36 Pressure gas line
37 First control valve
38 Second control valve
39 Temperature-regulation system
40 Level-regulating system
41 Gas line
42 Gas-shut-off valve
43 Sieve insert
44 Connecting line
45 Discharge apparatus
46 First flap
47 Second flap
48 Sieve insert
49 Guide plate
50 Piston plate
51 Screw

The invention claimed is:

1. A process comprising the steps of:
pelletizing polymer melts comprising blowing agent by injecting the polymer melts into a pelletizing chamber and then cutting the injected melts into individual pellets, wherein the cutting is conducted by a cutting apparatus while the melts are submerged in a liquid of a liquid circuit flowing through the pelletizing chamber, and wherein a pressure of the liquid in the chamber is elevated above ambient pressure during pelletizing;
discharging the pellets from the pelletizing chamber with the liquid of the liquid circuit as a pellet-loaded liquid;
comminuting agglomerates or pellets within the liquid which exceed a prescribed maximum size, wherein the comminuting takes place within a comminuting machine arranged downstream of the pelletizing chamber or by a comminuting unit arranged within the pelletizing chamber downstream of the cutting apparatus, wherein all pellets and agglomerates are distributed within said liquid so that agglomerates, pellets, and liquid are fed through the comminuting unit or comminuting machine during the comminuting, wherein the comminuting reduces an overall number of agglomerates, and wherein the comminuting machine comprises a knife rotating on a cutting plate;
depressurizing the pellet-loaded liquid from the elevated pressure to a lower pressure level using a depressurizing machine, wherein the depressurizing machine comprises a throttle apparatus, a turbine, at least one pump, or a rotating sluice valve, and wherein a pressure-equalizing chamber arranged upstream of the throttle apparatus keeps in essence constant each of said elevated liquid pressure and a liquid circuit flow rate through the pelletizing chamber; and
isolating the pellets from the pellet-loaded liquid.

2. The process according to claim 1, wherein the elevated pressure in the pelletizing chamber is in a range from 1 to 50 bar.

3. The process according to claim 1, wherein for start-up of the process, the pelletizing chamber is treated with gas at a process pressure by way of a pressure-equalizing line to the pressure-equalizing container.

4. The process according to claim 1, wherein said isolating takes place without any prior depressurization of the pellet-loaded liquid.

5. The process according to claim 1, wherein said isolating takes place within a solids separator.

6. The process according to claim 5, wherein the solids separator comprises a hydrocyclone, a filter, or a centrifuge.

7. The process according to claim 1, wherein the depressurizing machine comprises a throttle apparatus.

8. The process according to claim 1, wherein the depressurizing machine comprises a turbine.

9. The process according to claim 1, wherein the depressurizing machine comprises a rotating sluice valve.

10. The process according to claim 1, wherein the pellet-loaded liquid is guided through all parts of the depressurizing machine.

11. The process according to claim 10, wherein the depressurizing machine comprises two pumps arranged so that downstream of a first of the two pumps which conveys in a flow direction of the liquid circuit there is a second of the two pumps which has a lower power rating than the first pump, a flow direction of the second pump being the same as or opposed to the conveying direction of the first pump.

12. The process according to claim 1, wherein a pressure in the pressure-equalizing container is kept constant by way of a gas whereby in order to increase the container pressure, gas is introduced under pressure into the pressure-equalizing container, and in order to reduce the container pressure, gas is dissipated from the pressure-equalizing container.

13. The process according to claim 12, wherein a liquid level in the pressure-equalizing container is adjusted via the depressurizing machine.

\* \* \* \* \*